United States Patent [19]

Turski

[11] Patent Number: 5,729,755
[45] Date of Patent: Mar. 17, 1998

[54] PROCESS FOR TRANSMITTING DATA IN A DATA PROCESSING SYSTEM WITH DISTRIBUTED COMPUTER NODES, COMMUNICATING VIA A SERIAL DATA BUS, BETWEEN WHICH DATA MESSAGES ARE EXCHANGED, TESTED FOR ACCEPTANCE IN A COMPUTER NODE, AND STORED TEMPORARILY

[75] Inventor: Klaus Turski, Düsseldorf, Germany

[73] Assignee: NEC Corporation, Tokyo, Japan

[21] Appl. No.: 629,995

[22] Filed: Apr. 2, 1996

Related U.S. Application Data

[63] Continuation of Ser. No. 50,196, filed as PCT/EP92/02046, Sep. 4, 1992 published as WO93/05601, Mar. 18, 1993, abandoned.

[30] Foreign Application Priority Data

Sep. 4, 1991 [DE] Germany .......................... 41 29 412.2

[51] Int. Cl.$^6$ ............................................. G06F 15/00
[52] U.S. Cl. ................... 395/800; 364/724.01; 455/307; 455/339; 455/340; 395/200.17
[58] Field of Search ........................ 395/800, 200.17; 364/724.01; 455/307, 339, 340

[56] References Cited

U.S. PATENT DOCUMENTS

| | | | |
|---|---|---|---|
| 4,395,779 | 7/1983 | Fujino et al. | 455/306 |
| 4,716,410 | 12/1987 | Nozaki | 340/825.52 |
| 4,754,451 | 6/1988 | Eng et al. | 370/417 |
| 4,918,532 | 4/1990 | O'Connor | 348/726 |
| 4,964,076 | 10/1990 | Schurk | 340/825.5 |
| 5,097,433 | 3/1992 | Caracciolo | 364/724.01 |
| 5,170,498 | 12/1992 | Oto | 455/190.1 |
| 5,210,744 | 5/1993 | Yamanaka et al. | 370/413 |
| 5,222,106 | 6/1993 | Satoh et al. | 375/349 |
| 5,339,418 | 8/1994 | East et al. | 395/680 |

FOREIGN PATENT DOCUMENTS

| | | |
|---|---|---|
| 0 149 498 | 7/1985 | European Pat. Off. . |
| 0 228 078 | 7/1987 | European Pat. Off. . |
| 0 444 656 | 9/1991 | European Pat. Off. . |
| 35 06 118 | 8/1986 | Germany . |

OTHER PUBLICATIONS

Litchel et al. "CAN–Chip übernimmt Datenaustausch im Kfz," Elektronic Informationen, No. 3, 1988, pp. 46–53. No translation.

*Primary Examiner*—Alyssa H. Bowler
*Assistant Examiner*—John Follansbee
*Attorney, Agent, or Firm*—Scully, Scott, Murphy & Presser

[57] ABSTRACT

In a process for transmitting data in a data processing system and with a data processing system having distributed computer nodes (N) communicating with one another by way of a serial data bus (BUS) between which objects can be exchanged, it is provided that an object transmitted to the bus is tested in a computer node by a plurality of acceptance filters (AF1, AF2, AFm) which each have associated with them at least one receive buffer (RB1, RBn-1, RBn), and that after the receive buffer, the object is stored in a memory (M) associated with a central unit. Through the hierarchical arrangement of the acceptance filters, a freely-selectable association with the receive buffers and a definition as a band pass- or rejection filter, it is possible very flexibly to transmit further only desired objects and thus to provide an optimal configuration for managing the objects of a computer node.

6 Claims, 3 Drawing Sheets

PROCESS FOR TRANSMITTING DATA IN A DATA PROCESSING SYSTEM WITH DISTRIBUTED COMPUTER NODES, COMMUNICATING VIA A SERIAL DATA BUS, BETWEEN WHICH DATA MESSAGES ARE EXCHANGED, TESTED FOR ACCEPTANCE IN A COMPUTER NODE, AND STORED TEMPORARILY

This is a continuation of application Ser. No. 08/050,196, filed as PCT/EP92/02046, Sep. 4, 1992, published as WO93/05601, Mar. 18, 1993, now abandoned.

BACKGROUND OF THE INVENTION

1. Field of the Invention

The invention relates to a process for transmitting data in a data processing system and to a data processing system with distributed computer nodes communicating with one another via a serial data bus between which objects can be exchanged, are tested for acceptance in a computer node, stored temporarily and then stored away.

2. Discussion of the Prior Art

Data processing systems with distributed computer nodes that are connected via a serial data bus are used predominantly in industrial or automobile local networks. The computer nodes include data processing units or signal processing units that have a specified use. These include exchanging data between control units, sensors and actuators. Such local networks operate mainly under real time conditions, i.e. computer operations and control intervention must occur in certain time windows so as to accompany a process. The respective process parameters must thereby be transmitted punctually to the individual computer nodes to ensure an optimal process run. For a local network this means that the computer nodes make sufficient processing capacity available.

An example of the data processing systems defined above is the Controller Area Network (CAN) which defines a de facto standard protocol. CAN refers to the Open System Interconnection (OSI)-Reference model which is recommended for open systems which can be expanded at any time by further users or computer nodes. CAN differentiates between different levels, such as the physical level, the transfer level and the object level. The physical level substantially defines how signals are transmitted. Parameters for this purpose are the transmitting medium and the signal level. The transfer level includes the kernel of the CAN protocol. It forms the connecting link between the object level and the physical level and is responsible for bit-timing, synchronization, defining the object or message frame, transfer acknowledgement, error recognition and treatment thereof and for the arbitration, i.e. conflict resolution when a plurality of computer nodes access the bus simultaneously. The object level finally is responsible for filtering the object or message and for the treatment of the objects which have an overriding use level associated with them. Objects or messages are thereby transmitted in both directions from and to different use levels via the bus and respective intermediate physical levels, transfer levels and object levels. The physical level and the object level can be varied independently of the respective implementation.

The fundamental idea of the CAN-protocol is based on the idea of a common virtual data memory for all nodes of a data processing system defined above in which the network, due to its structure, has the task of actualising the data of this common virtual memory. According to the protocol the data to be transmitted from a node via the network is summarized to form messages or objects which correspond to a data frame. In the data frame different fields are defined which, for example, indicate the start and end of the frame and define the actual data field. Each object that is defined by the data frame includes, after a start-bit of the frame, a header part (identifier) which defines the data name and a priority of the object through which access to the bus is determined. The value of the header part thus determines the collision-free arbitration in the network. According to the CAN-protocol the header part is 11 bits long.

The messages or objects to be transmitted via the bus must be administered within a computer node. The transmission itself is a wide band transmission, i.e. without addressing a certain receiving node. An object to be transmitted to the bus therefore first arrives at all potential receivers which must then decide which messages or objects must be received from the information flow. Filtering out the important objects from the information flow occurs with reference to the header parts of the objects.

Control systems for filtering the objects for acceptance and the priority for evaluation which takes place at the object level are known which basically operate according to two different optimisation extensions. These optimisation extensions relate to different implementations of the object level to which the names "full-CAN" and "basic-CAN" have been applied.

An example of a full-CAN implementation is disclosed in DE-PS 35 06 118. The implemented object level carries out the entire data or object management on the network independently of the connected central unit (CPU) of the computer node. This is shown in FIG. 1. The computer node FN includes an electronic control unit FECU with a central unit and a control device FCC. The control system is connected to a data bus and includes an acceptance filter AF, a receive buffer RB and a memory M. Data transmitted to the bus first arrives at the acceptance filter AF which examines whether or not the objects are meant to be dealt with (managed) in the computer node. Individual addresses from the memory M are then associated with the objects by way of the receive buffer RB. The management of the objects 01, 02, ... 0n in the memory M is attended to by the control device FCC. The memory M is laid out as a dual port memory which can make the objects or object data available to the central unit in the electronic control system FECU and on the other hand to the bus.

The publication M. Litschel et al.: "CAN-Chip übernimmt Datenaustausch im Kfz", Elektronik Informationen Nr. 3, 1988, p. 46 to 53 describes a full-CAN controller with a memory field in which static communication objects are defined which serve as send/receive buffers for messages. A communication object is clearly associated with a message by the header part (identifier) defined in the object.

U.S. Pat. No. 4,964,076 describes a full-CAN implementation in which an acceptance filter recognises statically defined messages and stores them temporarily in receive buffers that each have one object associated with them statically. Details of the acceptance filter are not given.

The system according to FIG. 1 has the advantage that no processing power of the central unit is necessary for managing the objects, however, with the known control system there is the disadvantage that only a very limited number of objects or messages can be managed. Since each individual receive or send message is handled as a static object in the memory which occupies a corresponding memory field, even if an object occurs only very seldom or only in exceptional cases, the possible number of objects is limited due to the memory capacity of the dual port memory, i.e. the integration density.

With the basic-CAN implementation the central unit included in the electronic control unit attends to the entire object management, FIG. 2. A computer node BN with an electronic control unit BECU, which includes a central unit and a memory M, also has a control system BCC. The control unit BCC attends to exchanging the objects between the bus [and] the electronic control unit BECU. The control unit includes an acceptance filter AF and an input buffer RB. After passing through both these elements a received object is stored in the memory M managed by the central unit. In the memory address fields are associated with the objects. Obviously objects can be transmitted from the central unit to the bus in the opposite direction.

Management of the objects occurs in this case dynamically and has the advantage of a reduced circuit outlay with a theoretically unlimited number of objects to be managed. Depending on the object configuration the central unit has to manage uninteresting, but frequently occurring objects next to objects occurring less frequently but which are of particular interest. With an unfavourable object configuration and a high bus load the central unit is very heavily loaded. By being loaded with, in part, secondary management tasks, the central unit may possibly not have a sufficiently large capacity for managing and processing more important functions.

With present-day control devices, for example the module PCA82C200 from Phillips (sic), only one acceptance filter AF is provided which, depending on the position of the object of a computer node to be received in the object or address area of the memory, leads to insufficient prefiltering. A conventional acceptance filter is 8 bits wide and comprises different registers. One register is provided for an 8-bit code word and another for a mask word. The code word and the mask word are logically combined whereby a comparative word results that is compared with the 8 highest weighted bits of the 11 bit long header part of an object or a bus message. According to the predetermined comparison procedure, objects with which the comparison was positive are written in the receive buffer and thus accepted. These objects must be processed further and dealt with by the connected central unit. It is unavoidable that messages which should actually not be received by the computer node, also pass through the acceptance filter and must therefore be handled but rejected by the central unit. If, for example, the node is to receive a message that is directly next to a frequent message that must not be received, but falls in the window of the acceptance filter, the central unit must first receive the object and then reject it.

In the above-mentioned implementation there is the disadvantage that due to the arrangement of the acceptance filter, the smallest amount of objects which can be deallocated for reception consists of 8 neighbouring objects. In the case of unfavourable object configuration and frequency, this can lead to undesired high loading of the central unit. Furthermore there is the disadvantage that the topology of the acceptance filter is very inflexible. Only band pass fields which have a fixed width and which can be continued (repeated) periodically in the address or header part area of the objects can be defined. The known rigid topology therefore likewise leads to, amongst other things, an undesired high loading of the central unit.

SUMMARY OF THE INVENTION

It is an object of the invention to provide a process for transmitting data and a data processing system of the kind mentioned in the introduction with which, with dynamic object management, the load of the central unit can be reduced and an optimal configuration for object management for a respective computer node is made possible.

This object is achieved by a process for transmitting data in a data processing system with distributed computer nodes communicating with one another via a serial data bus, between which data messages can be exchanged. In a control device, data messages received at a computer node are tested for acceptance and stored temporarily and then stored in a memory associated with a central unit.

Pursuant to the process, a plurality of acceptance filters (AF1, AF2, AFm) are arranged in a hierarchy, and have associated with them a freely-selectable number of receive buffers (RB1, RBn-1, RBn) which are each provided for receiving more than one data message. The complete bit width of a header part (identifier) present in a data message is tested by the hierarchical arrangement of acceptance filters (AF1, AF2, AFm). An accepted data message is stored temporarily in one of the receive buffers (RB1, RBn-1, RBn) associated with the acceptance filters, and the data message stored temporarily by the receive buffer is stored in the memory (M). This object is further achieved by a data processing system with distributed computer nodes communicating with one another by a serial data bus, over which data messages can be exchanged, which includes a control device for acceptance testing and intermediate storage of data messages transmitted over the bus, and a central unit with a memory for storing accepted messages.

Pursuant to the system, the control device comprises a plurality of acceptance filters (AF1, AF2, AFm) arranged in a hierarchy, for testing the full bit width of a header part (identifier) present in a data message, and a plurality of receive buffers (RB1, RBn-1, RBn) freely-selectably associated with the acceptance filters, which are each provided to receive more than one data message.

The invention has the advantage that the entire flow of receive(d) messages can be distributed over a plurality of receive buffers. Frequent receive messages which require great management effort with dynamic object management can have exclusive receive buffers specified for them which enable a quasi-static object management so that the central unit only needs to read these messages when required and does not need to deal with them each time they are received. In a similar manner the plurality of acceptance filters allows the respective topology to be adapted to the special computer nodes. This includes the possibility of defining band pass and rejection filters, to associate several acceptance filters with one receive buffer and to arrange the acceptance filters in a hierarchy. Through the respective system according to the requirements of a computer node and a freely-selectable association of the acceptance filters with the receive buffers an optimal configuration for object management can be realised for the respective computer nodes according to its requirements so that the connected central unit has a low load despite dynamic management and therefore remains free for other tasks.

Embodiments of the invention are characterised by a process wherein the association of a receive buffer with an acceptance filter is effected by a receive buffer indicator of the acceptance filter, and a band pass field or a rejection field can be defined for each acceptance filter.

In embodiments of the data processing system, each acceptance filter includes two registers for a header part (identifier) of a data message or a mask with the bit width of the header part, and for additional control bits. Each acceptance filter can be defined by a part of the control bits as a band pass or rejection filter. The receive buffers have the bit width of the header part of the objects. Each acceptance filter includes a receiver buffer indicator by which a receive buffer is associated with the acceptance filters. Multiple association of several acceptance filters is provided with one receive buffer. A plurality of acceptance filters arranged one after the other serve to test a data message.

BRIEF DESCRIPTION OF THE DRAWINGS

The invention will now be described with reference to FIGS. 3 and 4 of the drawings. In the drawings.

DETAILED DESCRIPTION OF THE DRAWINGS

Figure 1:
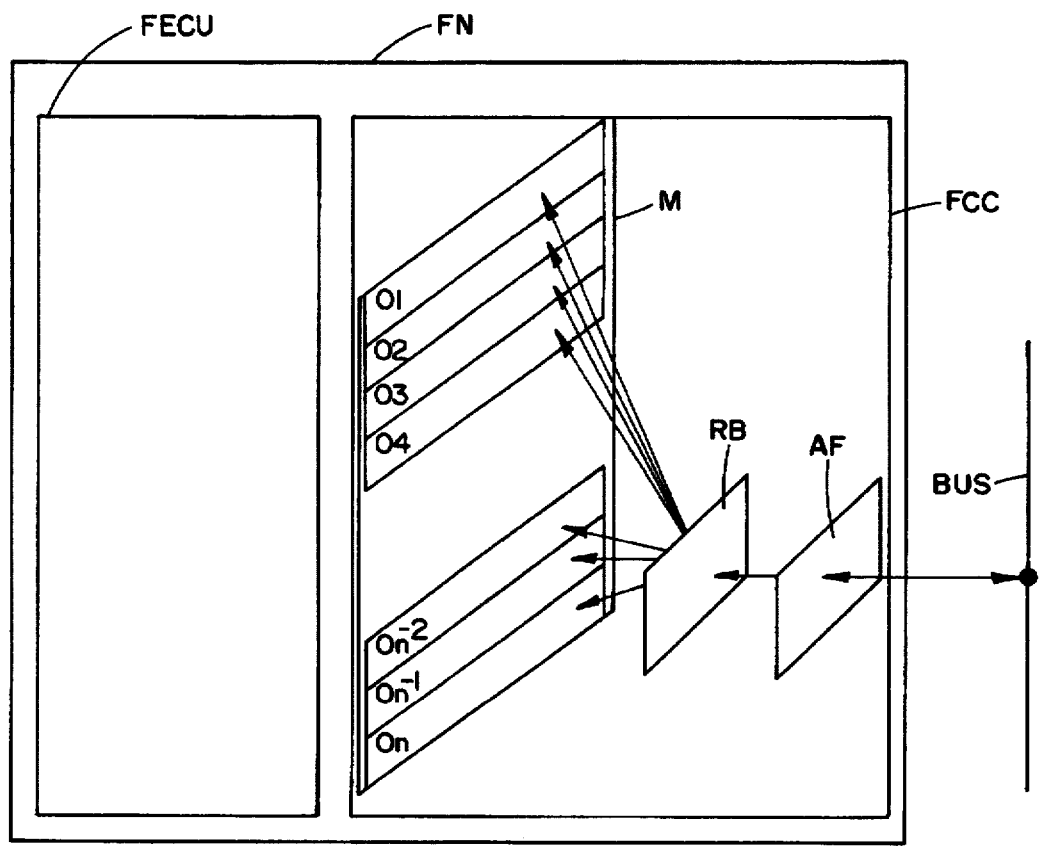
FIG. 1 shows a known computer node with full-CAN implementation.
Figure 2:
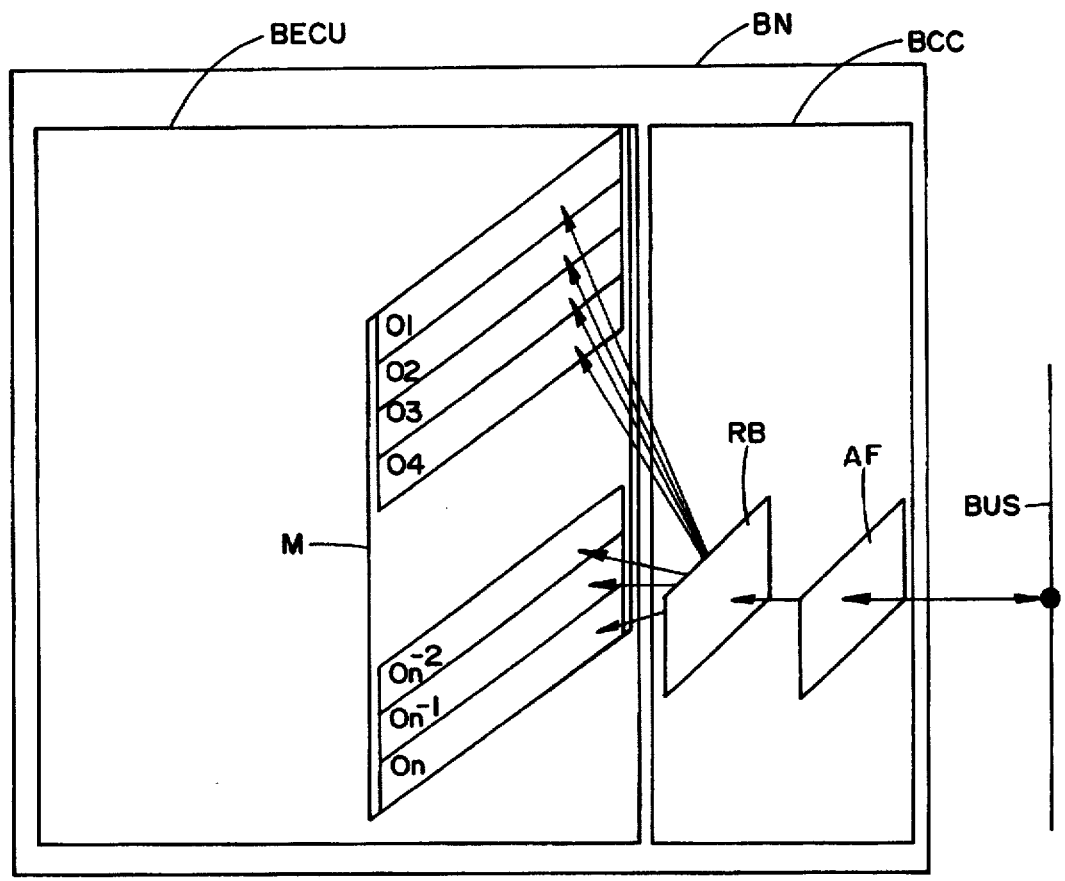
FIG. 2 shows a known computer node with basic-CAN implementation.
Figure 3:
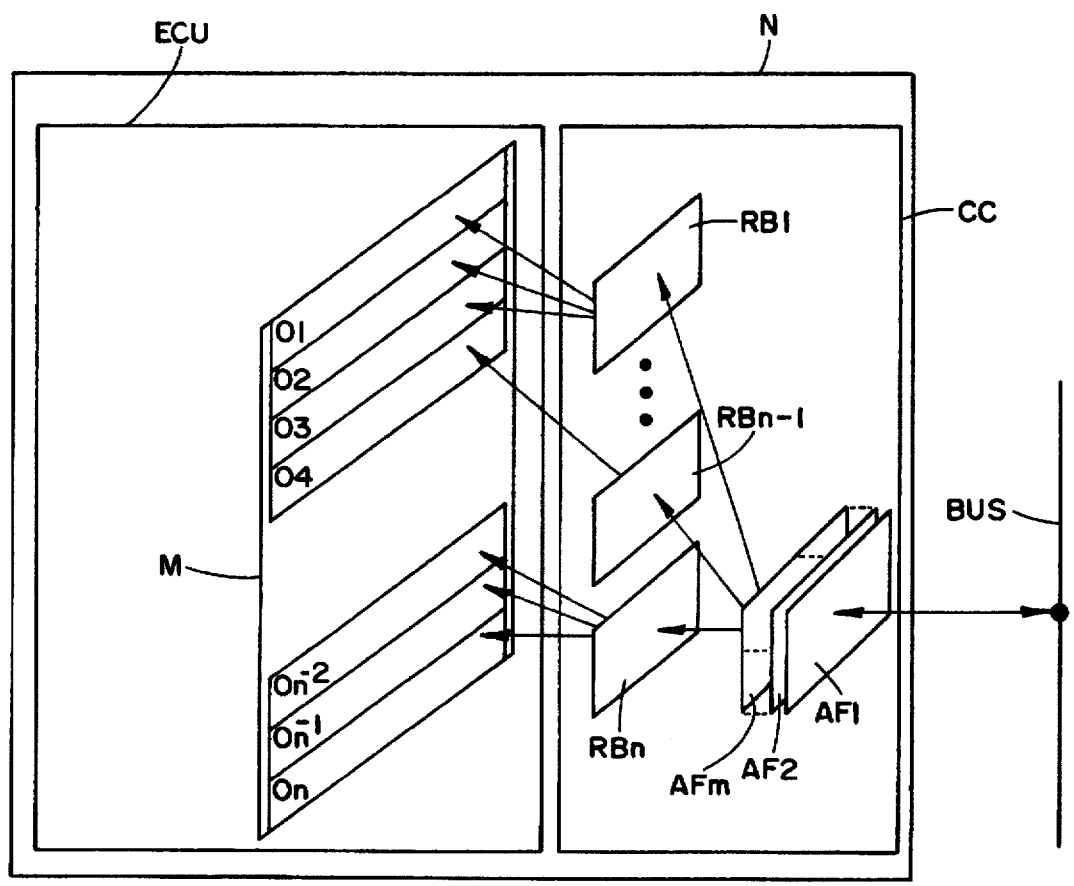
FIG. 3 shows a computer node with implementation of the control arrangement according to the invention.

As shown in FIG. 3 the computer node N has a control device CC and an electronic control unit ECU with a central unit (not shown) and a memory M. The control device CC comprises m acceptance filters and n receive buffers. Each acceptance filter AF1, AF2 to AFm includes two registers with a 16 bit width which contain the 11 bit wide header part (identifier) of an object or an 11 bit wide mask and additional respective control bits. By means of part of the control bits each filter can be defined as a band pass- or a rejection filter. Further control bits are provided for a receive buffer indicator whose bit width is given by the dual logarithms of the n receive buffers. The receive buffer indicator associates one of the n receive buffers with the respective filter. This association can be freely-selected. A plurality of acceptance filters AF1 to AFm can be associated with one receive buffer RB1 to RBn.

Figure 4:
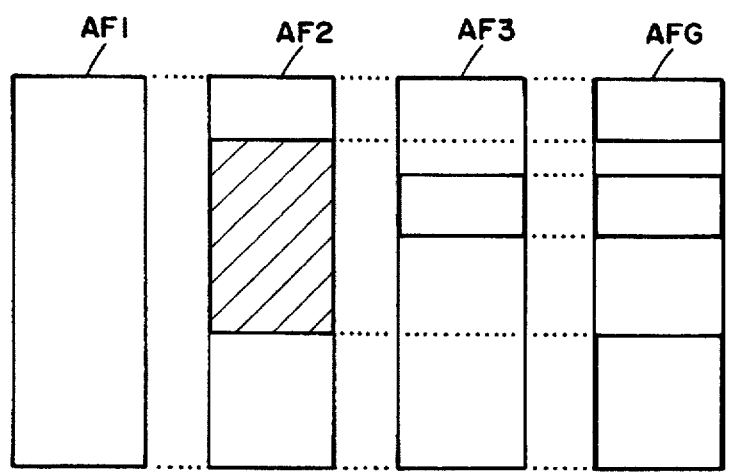
FIG. 4 shows an example for the association of several acceptance filters with an input buffer.

A hierarchical system of the acceptance filters in association with multiple association of several acceptance filters with a receive buffer make it possible to define a band pass field for the object to be stored in the memory M that is a combination of the superposition of several band pass- and rejection windows of individual acceptance filters. Such an example is shown in FIG. 4. From the characteristics of the filters AF1, AF2 and AF3 an overall characteristic results which applies to a filter AFG. It is hereby taken into consideration that the filters AF1 and AF3 define windows with a band pass field while the filter AF2 defines a window as a rejection field.

Since each acceptance filter has at its disposal the full bit width of a header part, the minimal window width amounts to one such acceptance filter, i.e. individual messages can be specified. It is obvious that, depending on the selection of the 11 mask bits, other window widths can be defined. In this way a very flexible topology of the acceptance window in the acceptance filter results.

As is made clear with reference to FIG. 3, the overall flow of receive objects can be distributed to several receive buffers by means of the acceptance filter. Through the selection of the system of the acceptance filters, it is possible, with a hierarchical filter structure, in connection with the definition of acceptance filters as band pass- or rejection filters and multiple association of several acceptance filters with one receive buffer, to very flexibly separate desired objects from undesired objects. Objects that are not desired do not need to be handled by the computer node and therefore do not load the central unit.

Exclusive input buffers which are comparable with static receive objects can be specified for frequent receive objects which, with a structure as shown in FIG. 3 with dynamic object management, require great management effort. The connected central unit need only read these objects when required but does not need to manage them every time they are received. These objects cannot be overwritten by other receive messages.

Owing to the optional association of the acceptance filters with the receive buffers an optimal configuration for managing the receive objects can be realised for the respective network node. As a result the central unit in the electronic control unit ECU can be relieved considerably of the dynamic object management. Subsequent selection in the sense of subsequent filtering of undesired receive messages can largely be avoided.

With the aid of individual, exclusively specified receive buffers, that have associated with them static receive objects, the operating efficiency of implementation according to a full-CAN computer node can be achieved in which, however, there are no restrictions with regard to limiting the overall number of objects that can be managed.

I claim:

1. A method for transmitting data in a data processing system which comprises distributed computer nodes communicating with one another via a serial data bus, said data being transmitted to each of the computer nodes over said serial data bus to be stored in a memory included in each of the computer nodes, said method comprising the steps of:

delivering each of said data to a plurality of digital acceptance filters which are arranged in a hierarchy;

controlling said digital acceptance filters in response to each of said data so as to selectively render said digital acceptance filters into digital band pass and digital band rejection filters and to define a digital band pass field for each of said data which is determined by a combination of the digital band pass and the digital band rejection filters and which is divisible into at least one partial field;

sending said at least one partial field to a register section which comprises a plurality of receive buffers, storing said at least one partial field in at least one of said receive buffers corresponding to said at least one partial field and producing the at least one partial field as an accepted object field; and storing said accepted object field in said memory.

2. The method according to claim 1, wherein said at least one partial field comprises a plurality of partial fields transmitted to a plurality of the receive buffers corresponding to said plurality of partial fields.

3. The method according to claim 1, wherein said at least one partial field comprises a plurality of partial fields transmitted to a single one of the receive buffers.

4. A data processing system comprising a plurality of computer nodes communicating with one another through a serial data bus, with data being transmitted from each of the computer nodes over said serial data bus to each of the computer nodes, each of said nodes comprising:

a plurality of digital acceptance filters which are selectively controlled as digital band pass and digital band rejection filters in response to each of said data for producing a digital band pass field which is determined by a combination of said digital band pass and said digital band rejection filters and which is divisible into at least one partial field;

a plurality of receive buffers for storing said at least one partial field within at least one of said receive buffers corresponding to said at least one partial field to produce the at least one partial field as an accepted object field; and a memory for storing said accepted object field.

5. The data processing system according to claim 4, wherein said plurality of digital acceptance filters are associated with a single one of said receive buffers.

6. The data processing system according to claim 4, wherein a single one of the digital acceptance filters is associated with a plurality of said receive buffers.

* * * * *